(12) United States Patent
Shafiee et al.

(10) Patent No.: US 6,771,766 B1
(45) Date of Patent: Aug. 3, 2004

(54) METHODS AND APPARATUS FOR PROVIDING LIVE AGENT ASSISTANCE

(75) Inventors: Mohammad Reza Shafiee, Ridgefield, CT (US); Sankar Subramanian, Briarcliff Manor, NY (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/551,758

(22) Filed: Apr. 18, 2000

Related U.S. Application Data

(60) Provisional application No. 60/151,793, filed on Aug. 31, 1999, and provisional application No. 60/172,321, filed on Dec. 17, 1999.

(51) Int. Cl.[7] .............................................. H04M 1/64
(52) U.S. Cl. ............................. 379/265.09; 379/265.13
(58) Field of Search ....................... 379/265.09, 202.01, 379/266.09, 265.13

(56) References Cited

U.S. PATENT DOCUMENTS

| | | | |
|---|---|---|---|
| 5,884,032 A | 3/1999 | Bateman et al. | 395/200.34 |
| 5,894,512 A | 4/1999 | Zenner | 379/265 |

*Primary Examiner*—Ahmad F. Matar
*Assistant Examiner*—Rasha Al-Aubaidi
(74) *Attorney, Agent, or Firm*—Leonard C. Suchyta, Esq.; Joel Wall; Michael Straub, Esq.

(57) ABSTRACT

Establishing a conference between a customer at a customer terminal and a live agent at an agent station, by (a) accepting a call request from the customer terminal, (b) requesting that an available live agent take the call request, (c) when a live agent becomes available to take the call request, passing customer information to the agent station associated with the available live agent, and (d) establishing a conference from the agent station associated with the available live agent to the customer terminal. The conference may be an audio-video conference. The audio-video conference may be compliant with the H.323 standard. The call request may generated in response to an event sensed by an API which was previously downloaded to the customer terminal from a web server. The call request may be generated in response to a trigger event. The trigger event may be a customer request for a live agent, adding an item to a virtual shopping cart, adding items having a total purchase prices of more than a predetermined threshold to a virtual shopping cart, removing an item from a virtual shopping cart, dwelling at a certain web page for more than a predetermined length of time, rendering certain content, rendering a certain sequence of content, filling out a form, or issuing a particular command. The customer information may include an Internet protocol address of the customer terminal, a video capability of the customer terminal, and/or a browser type used by the customer terminal.

10 Claims, 15 Drawing Sheets

| Field Name | Size (in bytes) | Description |
|---|---|---|
| Login | 8 | Unique Login Name |
| Password | 8 | Password for this login |
| Port_Id | 16 | Unique system assigned Identifier. |
| Dir_Listing | 48 | Name for this user as it appears in a Directory |
| Profile_Flag | 4 | Profile Flag for stations |
| Category_Flag | 8 | Category Flag (capabilities / authorization) |
| Pug_Member | 8 | Private User Group Flag |
| Primary_Skill_Flag | 8 | Flag Identifying the agents Primary Skill |
| Secondary_Skill_Flag | 8 | Flag Identifying the agents Secondary Skill |
| Default_Skill_Flag | 8 | Flag Identifying the agents Default Skill |
| configNum | 4 | Configuration File Number (PUG) |
| BitmapName | 16 | Bitmap Name |

FIGURE 7

| Field Name | Size (in bytes) | Description |
|---|---|---|
| Skill_Name | 48 | Name of this skill (unique) |
| Primary_Timeout | 8 | Primary Timeout in seconds (from hh.mm.ss) |
| Pri_VC Protocol | 4 | |
| Pri_VC_Address | 48 | |
| Secondary_Timeout | 8 | Secondary Timeout in seconds (from hh.mm.ss) |
| Sec_VC Protocol | 4 | |
| Sec_VC_Address | 48 | |
| Default_Timeout | 8 | Default Timeout in seconds (from hh.mm.ss) |
| Def_VC Protocol | 4 | |
| Def_VC_Address | 48 | |

FIGURE 8

| Field Name | Size (in bytes) | Description |
|---|---|---|
| Category_Name | 48 | Name for Category (unique) |

FIGURE 9

| Field Name | Size (in bytes) | Description |
|---|---|---|
| Pug_Name | 48 | Private_User_Group Name (unique) |

FIGURE 10

|  | Field Name | Type | Size (in bytes) | Description |
|---|---|---|---|---|
| 1152 → | Login | Char | 8 | The login name for this station |
| 1154 → | Password | Char | 8 | Associated Password field |
| 1156 → | Port_Id | Char | 16 | Stations Port_Id (unique) |
|  | Dir_listing | Char | 48 | The Directory Listing Field for the station |
|  | ProfileFlag | Long | 4 | Profile Flag |
|  | CategoryFlag | Long | 4 | CategoryFlag (Capabilities/authorization Flag) |
|  | PugFlag | Long | 4 | Privatue User Group Flag(PUG) |
|  | PriSkillFlag | Long | 4 | Primary Skill Flag (agent/ service only) |
|  | SecSkillFlag | Long | 4 | Secondary Skill Flag (agent / service only) |
|  | DefSkillFlag | Long | 4 | Default Skill Flag (agent / service only) |
|  | Status | Int | 4 | Station Status Field |
|  | Timeout_Ticks | Long | 4 | Time from last station request |
| 1162 → | VC_Protocol | Long | 4 | Video Conferencing Type Identifier |
| 1164 → | VC_Address | Char | 48 | Video Conferencing Address |
| 1166 → | Alt_Protocol | Long | 4 | Alternate Video Conferencing Type Identifier |
| 1168 → | Alt_Address | Char | 48 | Alternate Video Conferencing Address |
| 1170 → | IPAddress | Char | 48 | IP Address of a station |
|  | PortNum | Long | 4 | Port Number of a station |
| 1182 → | EncryptionType | Long | 4 | Encryption Type Employed |
| 1184 → | EncryptionKey | Char | 48 | Enryption Key |
|  | ConfigNum | Long | 4 | Default Configuration Number (PUG) |
|  | BitmapName | Char | 16 | Default Bitmap Name |

| Field Name | Type | Size (in bytes) | Description |
|---|---|---|---|
| StartTime | Time_t | 4 | Start time of the call |
| Party[0] | Int | 4 | Call Owner |
| Party[1] | Int | 4 | Party 1 |
| Party[2] | Int | 4 | Party 2 |
| Party[3] | Int | 4 | Party 3 |

| Field Name | Type | Size (in bytes) | Description |
|---|---|---|---|
| SkillName | Char | 48 | The name of the skill |
| skillFlag | Long | 4 | Skill Flag |
| PrimaryTimeOut | Long | 4 | Primary Timeout in sec |
| SecondaryTimeOut | Long | 4 | Secondary Timeout in sec |
| DefaultTimeOut | Long | 4 | Default Timeout in sec |

FIGURE 13

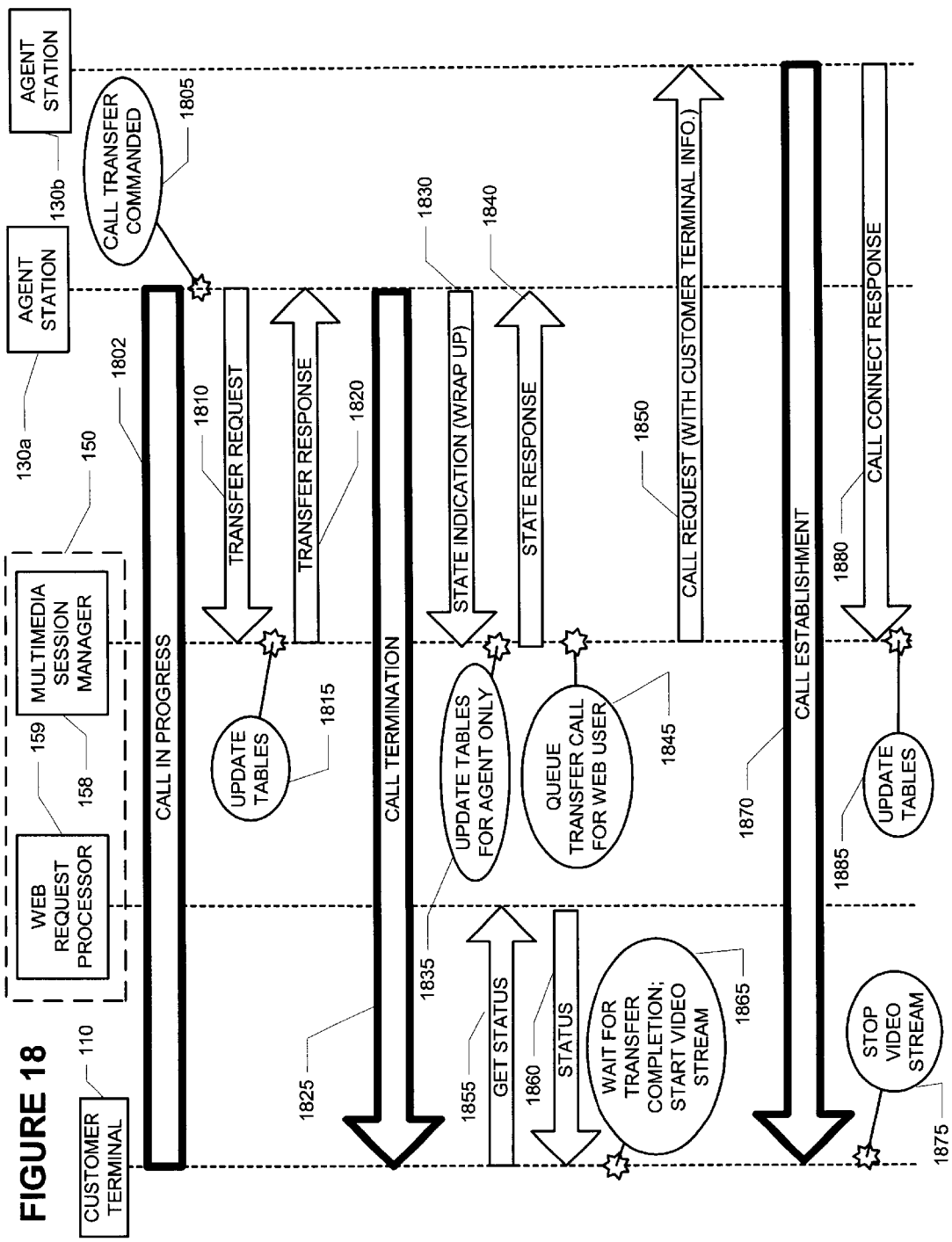

METHODS AND APPARATUS FOR PROVIDING LIVE AGENT ASSISTANCE

§0. RELATED APPLICATIONS

Benefit is claimed, under 35 U.S.C. §119(e)(1), to the filing date of provisional patent application serial No. 60/151,793, entitled "Interactive Multimedia System for Use with Kiosks and Internet Based Customers", filed on Aug. 31, 1999 and listing M. Reza Shafiee and Sankar Subramanian as inventors, for any inventions disclosed in the manner provided by 35 U.S.C. §112, ¶ 1. Benefit is also claimed, under 35 U.S.C. §119(e)(1), to the filing date of provisional patent application serial No. 60/172,321, entitled "Home-Based Internet Agent Assistance", filed on Dec. 17, 1999 and listing M. Reza Shafiee and Sankar Subramanian as inventors, for any inventions disclosed in the manner provided by 35 U.S.C. §112, å 1. These provisional applications are expressly incorporated herein by reference.

§1. BACKGROUND OF THE INVENTION

§1.1 Field of the Invention

The present invention concerns methods, apparatus and data structures for providing live agent assistance. More specifically, the present invention concerns methods, apparatus and data structures for invoking and establishing an audio, video, and/or data (e.g., text message) "call" or "conference" between a live agent and a customer in response to some event which may occur while the customer is browsing content on a network, such as the Internet for example.

§1.2 Related Art

Below, methods for providing customer service, as well as perceived shortcomings of such methods, are introduced. More specifically, Internet-based customer service and its perceived shortcomings are introduced in §1.2.1 below. Then, a system in which customers can access live agents from kiosks and its perceived shortcomings are introduced in §1.2.2. The discussion of these systems in this section is not, and should not be interpreted as, an admission that such systems are prior art.

§1.2.1 Internet-based Customer Service

The Internet has been successfully used to reduce the need for human customer service representative. That is, in many instances, customers can use the Internet to answer questions that they would otherwise present to a human customer service representative (also referred to as a "live agent"). However, the present inventors believe that in many instances, customers still would like to confer with (e.g., talk and/or see) a live agent. For example, a customer's uncertainty may prevent them from consummating an on-line transaction. In such instances, it would be helpful to have a live agent address any concerns the customer has so that the customer will feel comfortable in consummating (or will be able to consummate) the transaction. Although a customer may call a live agent, conferencing over the telephone with a live agent while viewing web pages may be inefficient. Further, in some instances, a single telephone line is used for both Internet access and telephone service. Thus, conferencing over the telephone with a live agent is not possible when viewing web pages under such circumstances. The present inventors also believe that it would be helpful to have a live agent suggest a purchase or a transaction to potential customers. Finally, the present inventors believe that it would be helpful for the live agent to have some customer information up-front, at or shortly after the start of the conference, so the customer does not have to provide the live agent with information already provided over the Internet (for example, via forms) or available from another source. As will be demonstrated in the following, the present invention may be used to achieve these advantages of providing a live agent to assist customers.

§1.2.2 Kiosk System

Provisional patent application serial No. 60/151,793, entitled "Interactive Multimedia System for Use with Kiosks and Internet Based Customers", and filed on Aug. 31, 1999, discloses a multimedia call center (or "MCC") in which live agents can assist customer end users at kiosk stations. It is expected that such kiosks will be located in areas open to the public, and preferably areas with high traffic such as airports, malls, grocery stores, train stations, bus terminals, etc. In such a system, a live agent can help a customer or potential customer complete a transaction. However, the present inventors believe that in addition to providing live agents to customers at kiosks, it would be helpful to permit live agents to assist customers at any terminal, such as a home computer connected to the Internet for example.

§2. SUMMARY OF THE INVENTION

The MCC described in provisional patent application serial No. 60/151,793 can be supplemented so that the same live agents that help customers at kiosks (or, alternatively, other live agents), can assist customers or potential customers in completing a transaction over any terminal (such as a home computer for example) connected with a network (such as the Internet for example). Internet customers are provided with video, audio and/or other data (e.g., text messages) from live agents with which they interact over the Internet. The live agent can lead the customer through various web pages using a web browser (as described in U.S. patent application Ser. No. 09/487,049, entitled METHODS AND APPARATUS FOR PROVIDING AGENT CONTROLLED SYNCHRONIZED BROWSING AT A TERMINAL, by M. Reza Shaffie and Sankar Subramanian, filed Jan. 19, 2000 and incorporated herein by reference), enter information, answer questions and confirm orders. The live agent may receive textual inputs from the customer via the customer's key board, selection inputs from the customer via a pointing device, such as a mouse for example, audio input from the customer via a microphone, and/or video information from the customer via a camera. Even if the customer does not have a microphone or other audio input means at their premises, they can still receive audio information from the live agent. Similarly, even if the customer does not have a video camera or other video input means at their premises, they can still receive video information from the live agent. Accordingly, as used below, a "call" or a "conference" may include two-way audio/video communications, two-way audio, one-way video communications, two-way audio communications, text messaging (e.g., "chat" window) communications, or any combination of audio, video, and/or data (e.g. text messaging) communications.

The present invention may be used to establish a conference between a customer at a customer terminal and a live agent at an agent station, by (a) accepting a call request from the customer terminal, (b) requesting that an available live agent take the call request, (c) when a live agent becomes available to take the call request, passing customer information to the agent station associated with the available live agent, and (d) establishing a conference from the agent station associated with the available live agent to the customer terminal.

The conference may be an audio-video conference. The audio-video conference may be compliant with the H.323 standard.

The call request may generated in response to an event sensed by an API which was previously downloaded to the customer terminal from a web server.

The call request may be generated in response to a trigger event. The trigger event may be a customer request for a live agent, adding an item to a virtual shopping cart, adding items having a total purchase prices of more than a predetermined threshold to a virtual shopping cart, removing an item from a virtual shopping cart, dwelling at a certain web page for more than a predetermined length of time, rendering certain content, rendering a certain sequence of content, filling out a form, or issuing a particular command.

The customer information may include an Internet protocol address of the customer terminal, a video capability of the customer terminal, and/or a browser type used by the customer terminal.

§3. BRIEF DESCRIPTION OF THE DRAWINGS

Figure 1:
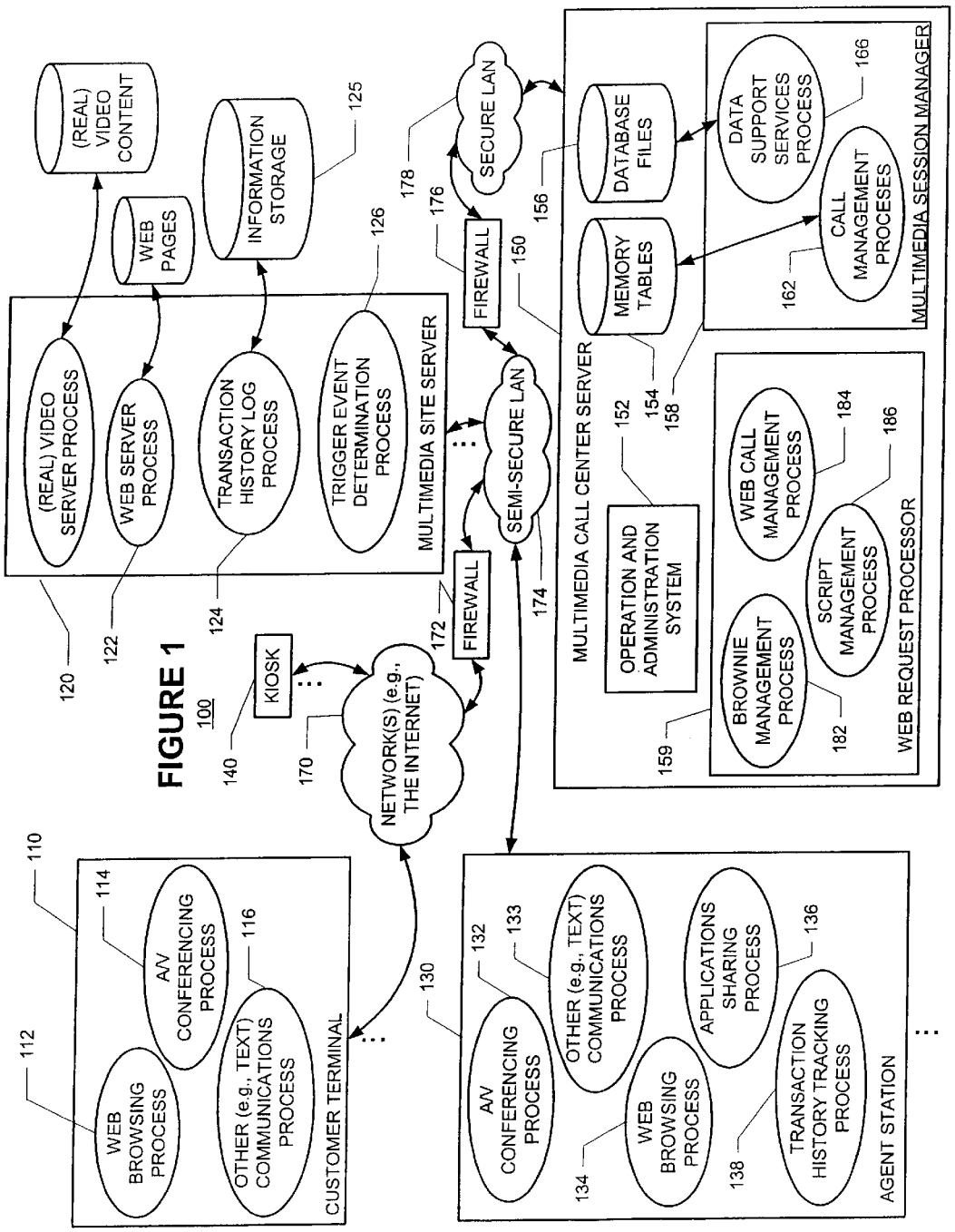
FIG. 1 is a diagram of a system in which the present invention may operate.
Figures 4, 4A:
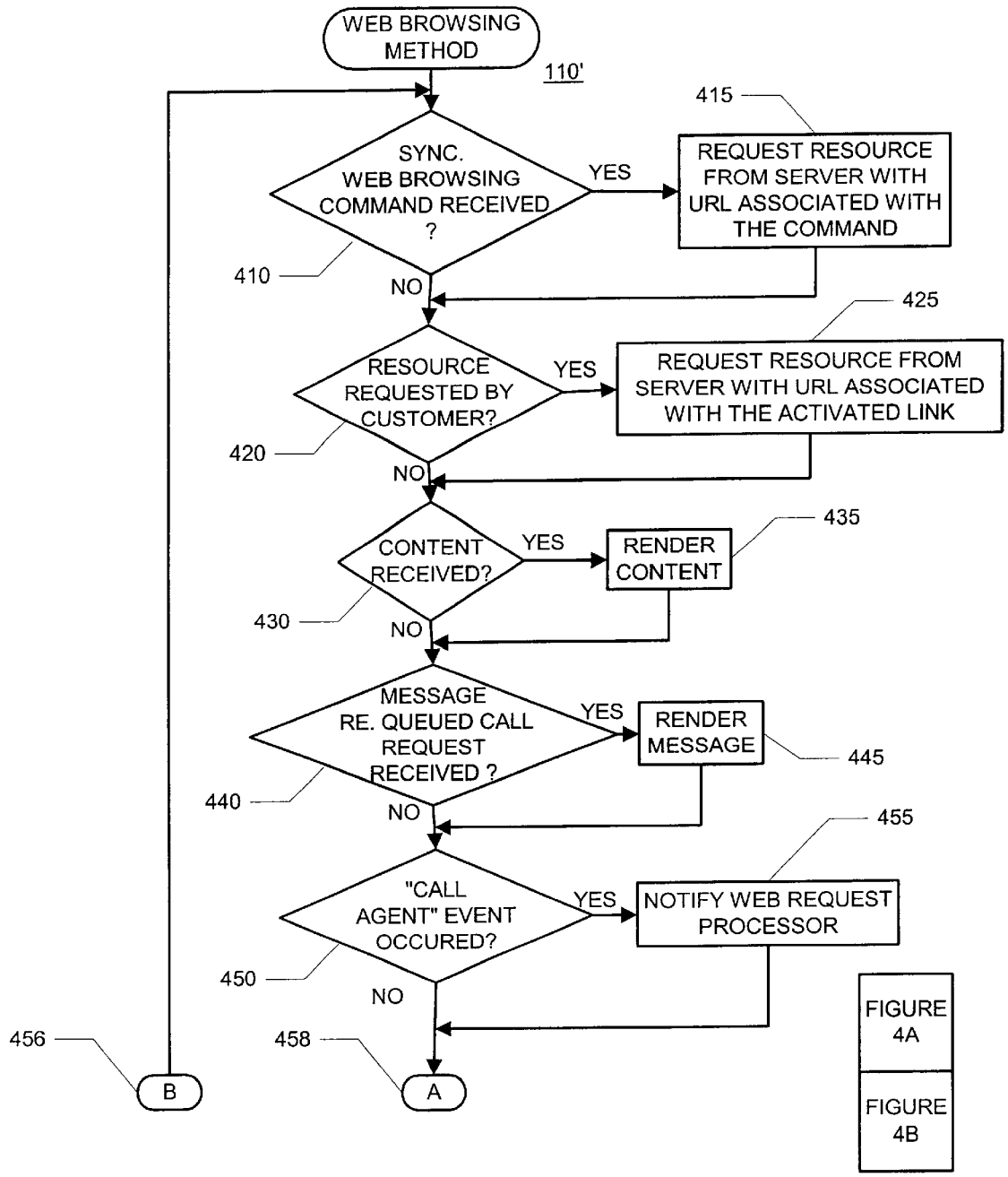
Figure 4B:
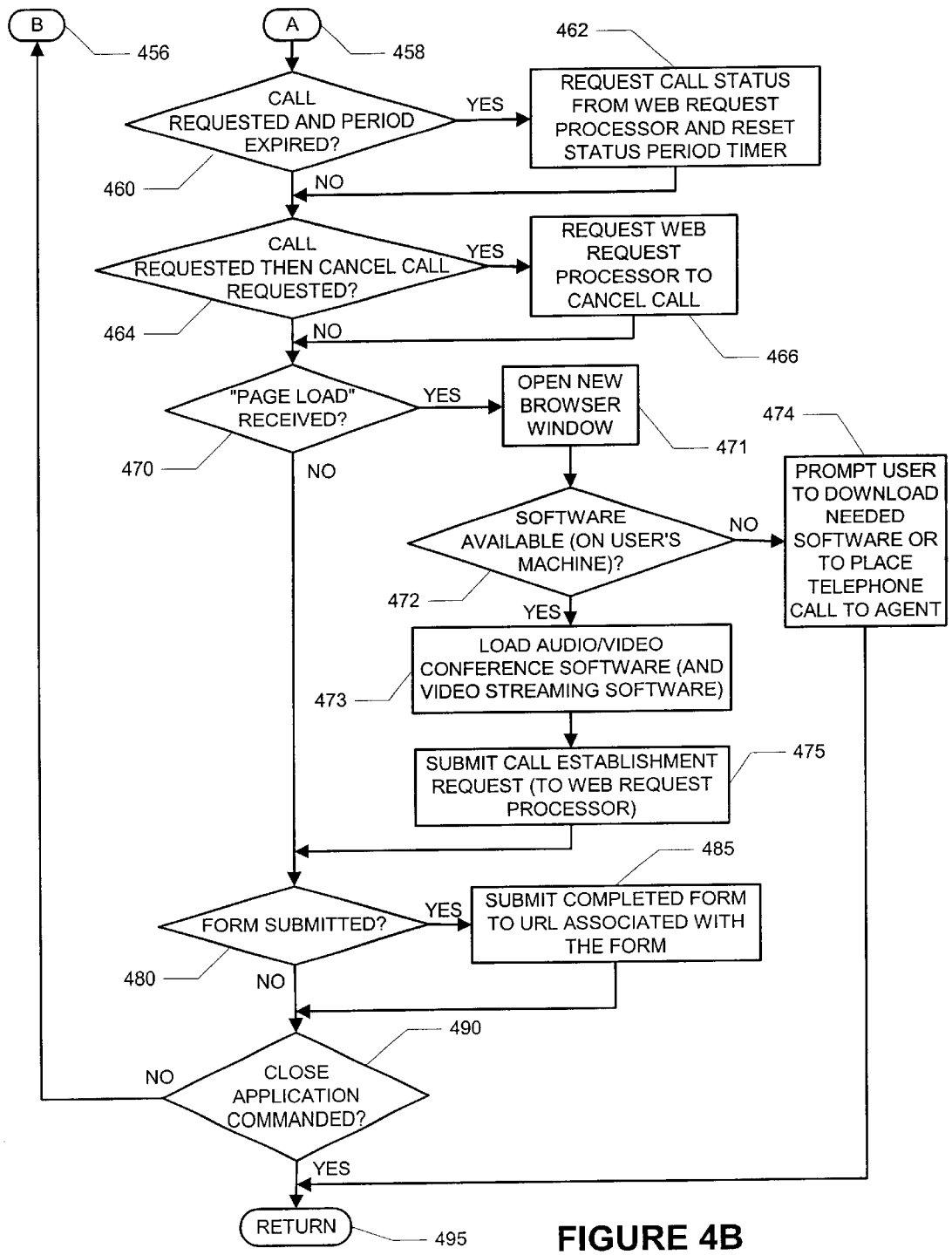

FIG. 4, which includes FIGS. 4A and 4B, is a flow diagram of an exemplary method for effecting a web browsing process which may be performed by a customer terminal in the system of FIG. 1.

Figure 5:
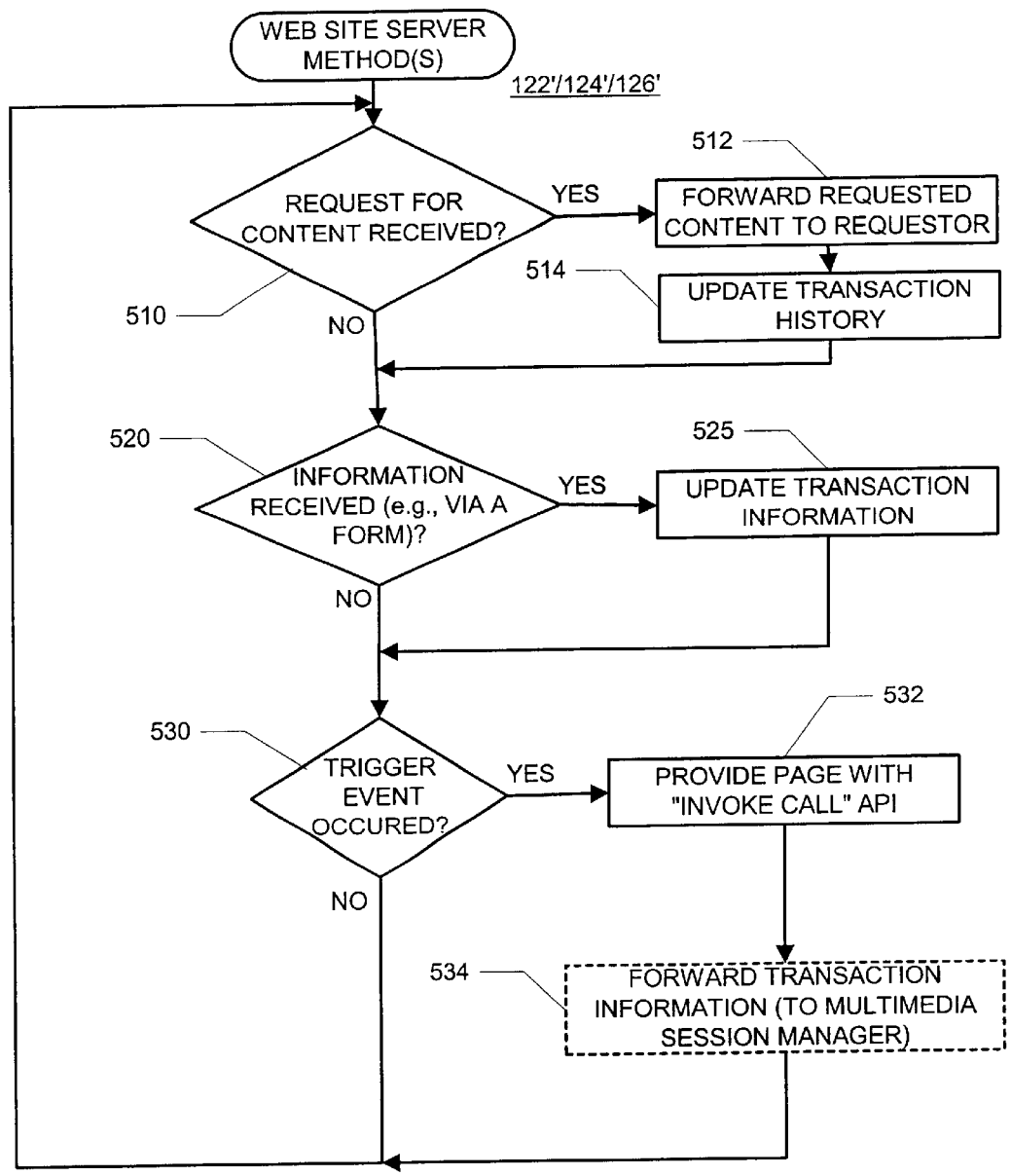

FIG. 5 is a flow diagram of an exemplary method for effecting processes which may be performed by a site server in the system of FIG. 1.

Figure 6:
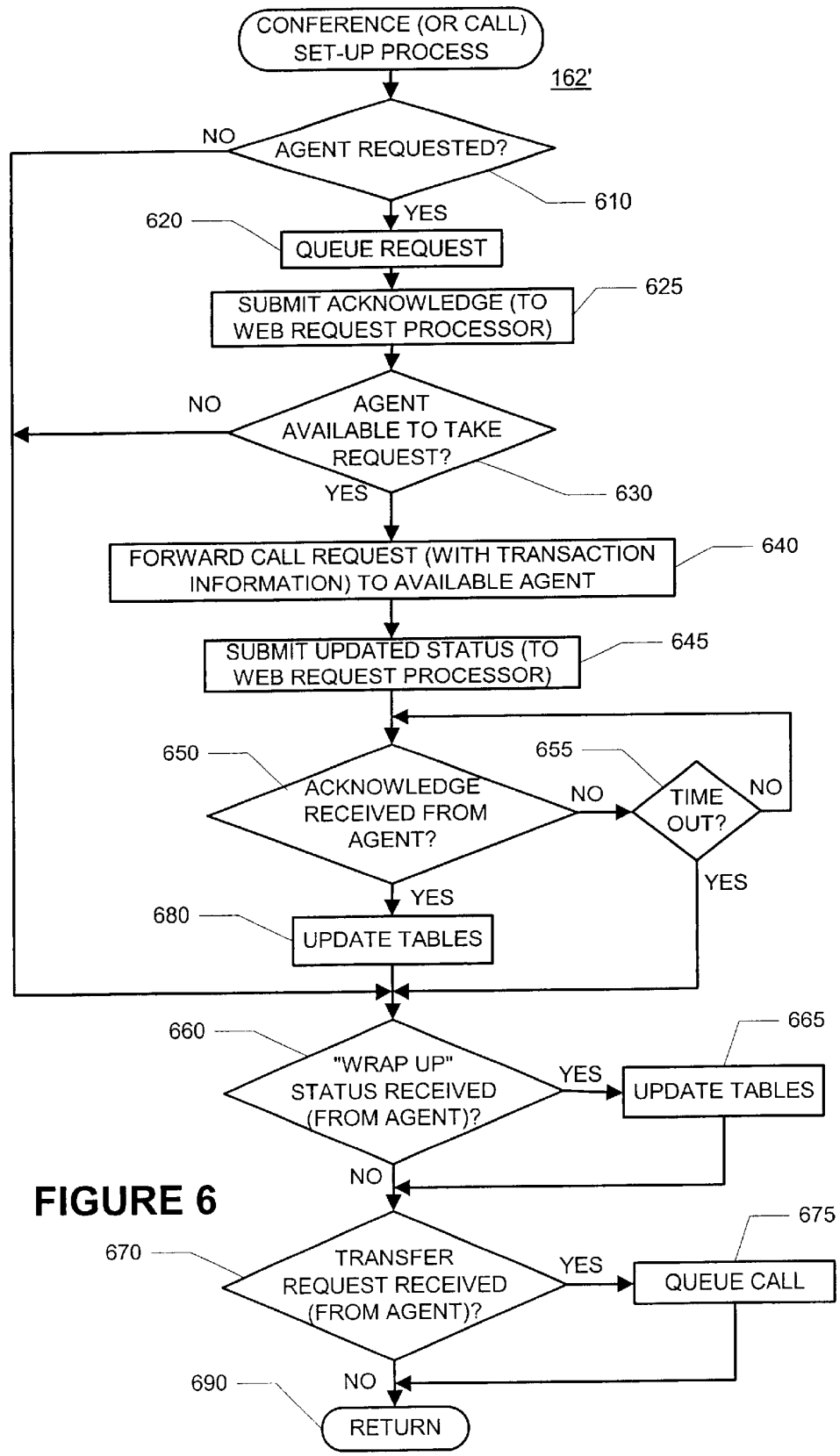

FIG. 6 is a flow diagram of an exemplary method for effecting a process for invoking the establishment of a call between a customer at a customer terminal and an agent at an agent station in the system of FIG. 1.

FIG. 7 illustrates an exemplary directory database which contains a list of all stations known to a session manager in the system of FIG. 1.

FIG. 8 illustrates an exemplary skill database which contains a list of all skills of agents known to a session manager in the system of FIG. 1.

FIG. 9 illustrates an exemplary category database which contains a list of all category names known to a session manager in the system of FIG. 1.

FIG. 10 illustrates an exemplary private user group database which contains a list of all private user group names known to a session manager in the system of FIG. 1.

FIG. 11 illustrates an exemplary station table which may be used in the system of FIG. 1.

FIG. 12 illustrates an exemplary active call table which may be used in the system of FIG. 1.

FIG. 13 illustrates an exemplary skill table which may be used in the system of FIG. 1.

Figure 14:
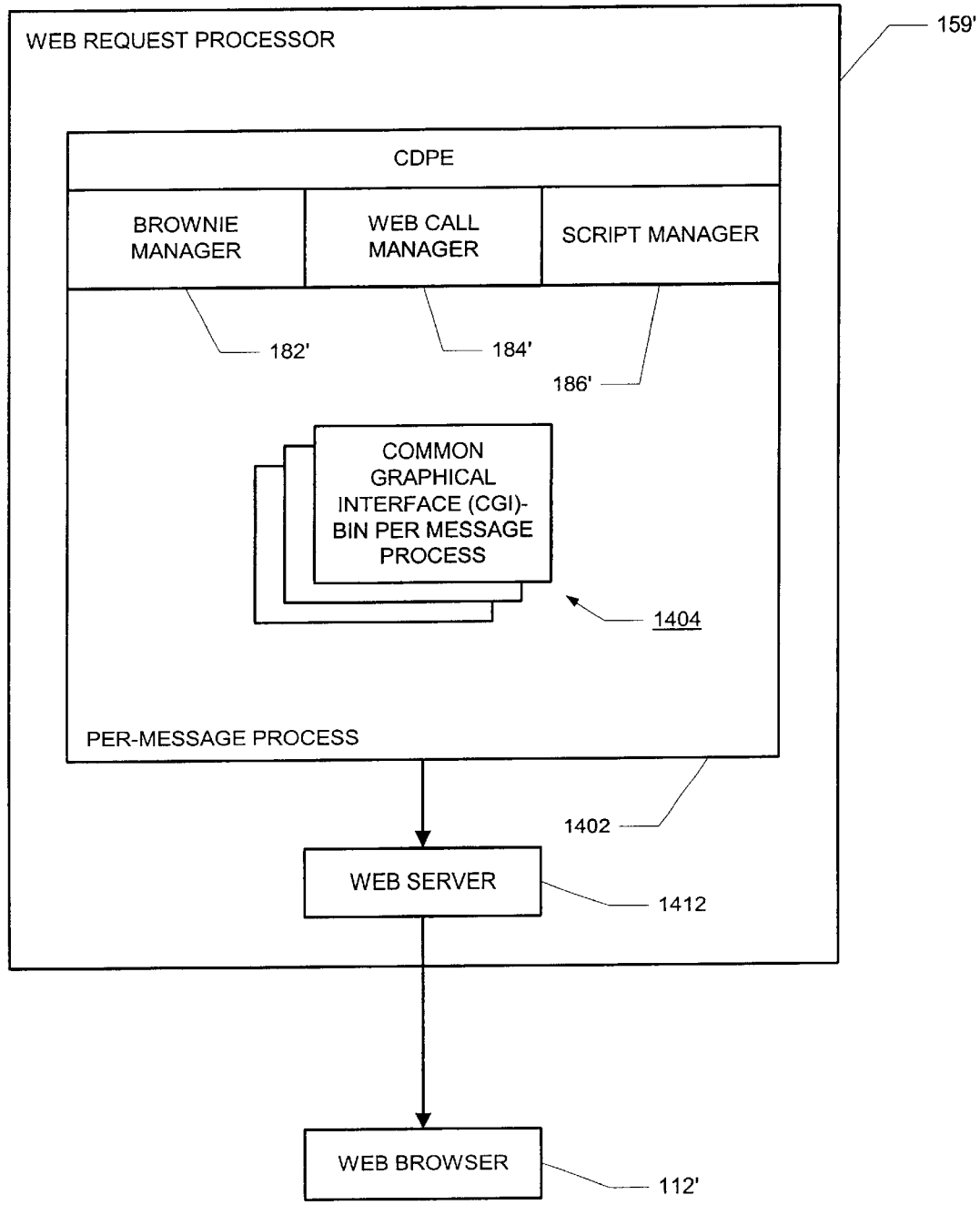

FIG. 14 illustrates components of an exemplary web request processor which may be used in the system of FIG. 1.

Figure 15:
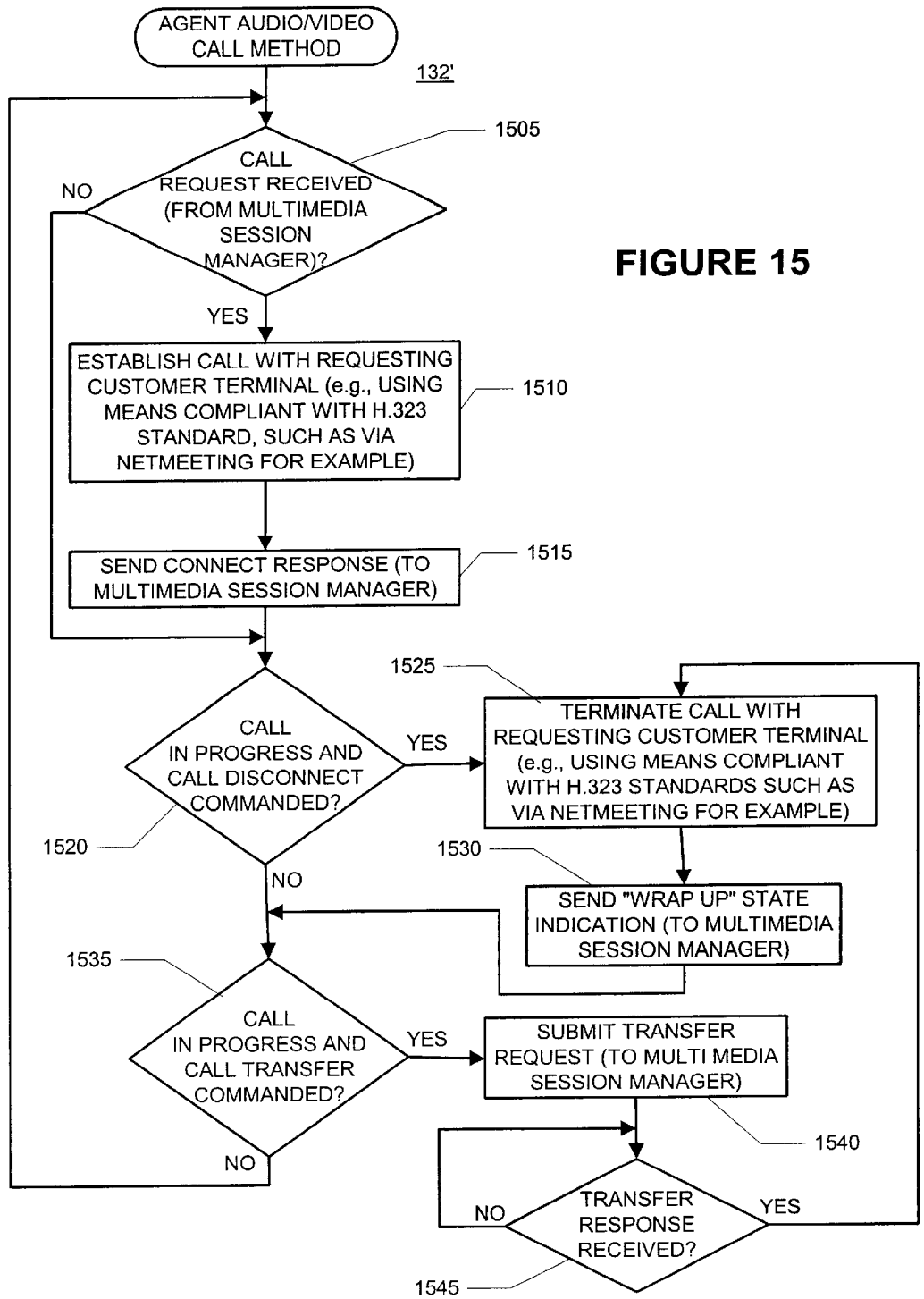

FIG. 15 is a flow diagram of an exemplary method for effecting a process for setting up a call between a customer at a customer terminal and an agent at an agent station in the system of FIG. 1.

Figure 16:
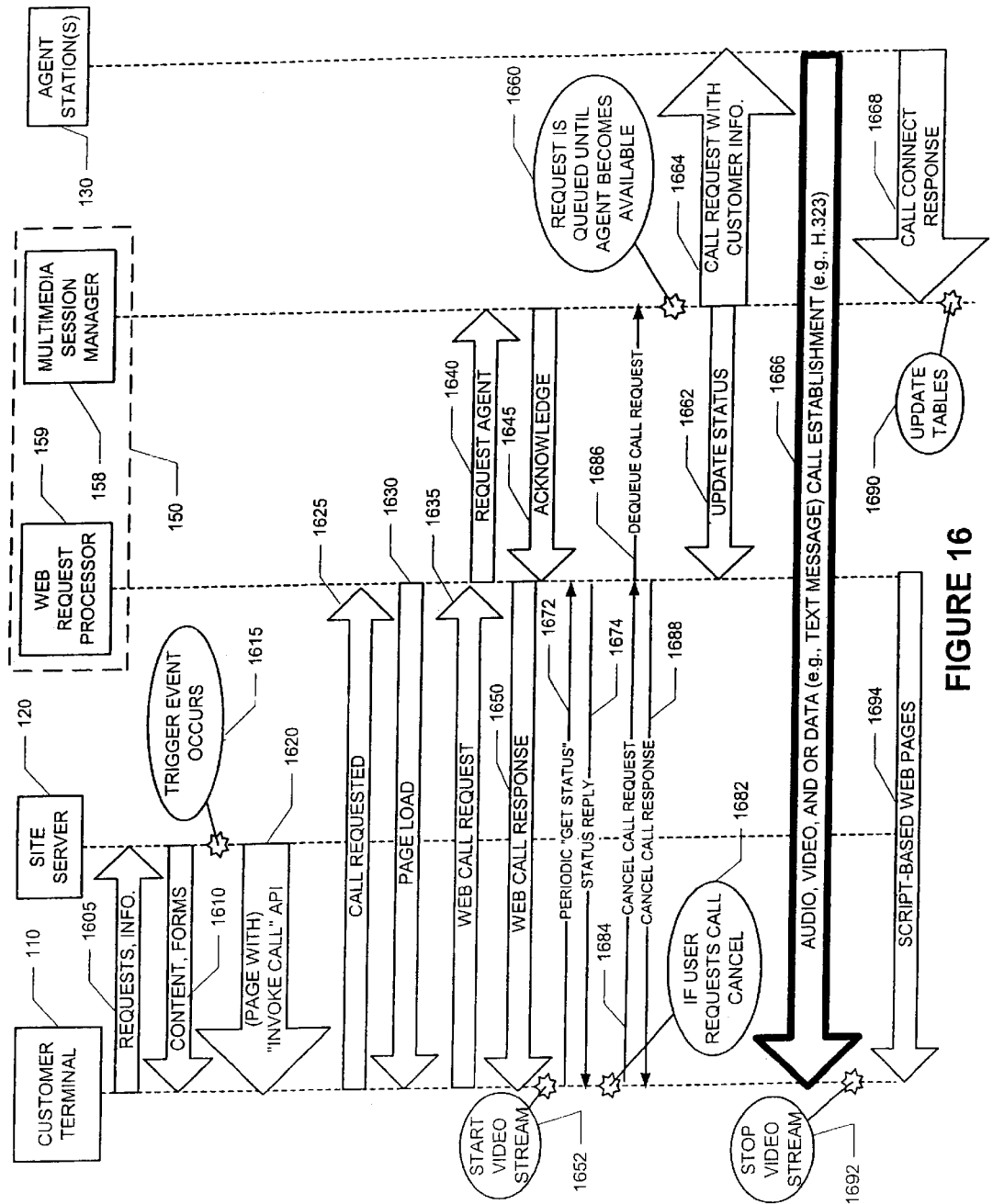

FIG. 16 is a messaging diagram of the establishment of a call between a customer at a customer terminal and an agent at an agent station in the system of FIG. 1.

Figure 17:
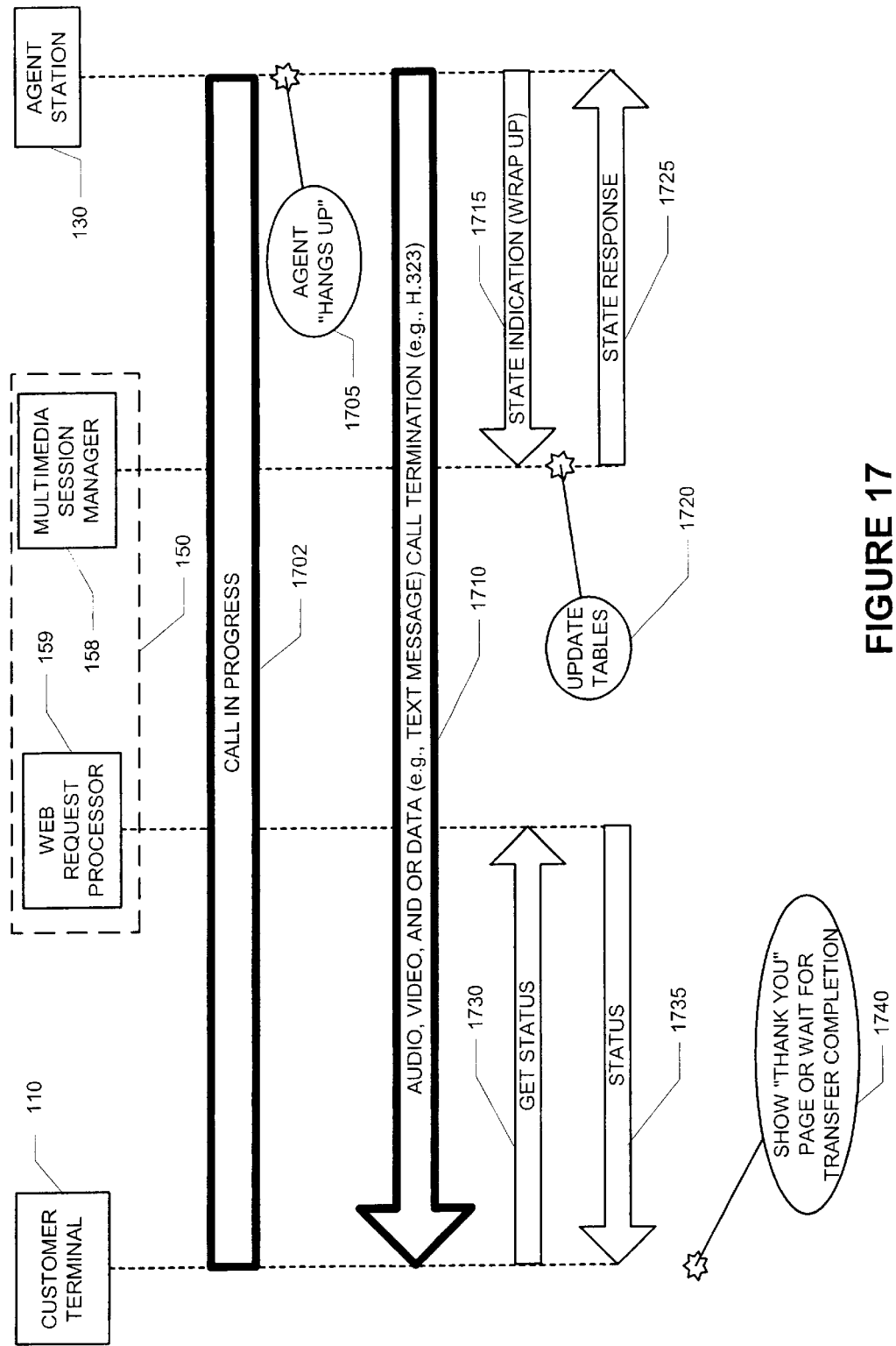

FIG. 17 is a messaging diagram of the termination of a call between a customer at a customer terminal and an agent at an agent station in the system of FIG. 1.

FIG. 18 is a messaging diagram of the transfer of a call between a customer at a customer terminal and an agent at an agent station, to another agent in the system of FIG. 1.

§4. DETAILED DESCRIPTION

The present invention involves novel methods and apparatus for providing live agents to assist customers. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the disclosed methods, apparatus and any other patentable subject matter to the extent that they are patentable.

In the following, functions which may be performed by the present invention are introduced in §4.1. Then, structures, processes, methods and data structures which may be used to effect those functions are described in §4.2. Finally, examples of how an exemplary system of the present invention operates are described in §4.3.

§4.1 Functions which May Be Performed

At a high level, the present invention may function to facilitate a "call" or "conference" between a live agent and a customer via an interface which may be used in conjunction with, or which may be a part of, a web browser. Further, the present invention may function to provide one or more triggers for invoking the establishment of such a call or conference. Other, more specific functions which may be performed by the present invention are introduced below when the various components of system are described.

§4.2 Structures, Processed, Methods and Data Structures

An overview of a system which may be used to effect various aspects of the present invention is introduced in §4.2.1 below. Then, various components of the system are described in more detail in §§4.2.1.1 through 4.2.1.4 below. Finally, examples which illustrate operations of the exemplary system are provided in §4.3 below.

§4.2.1 System Overview

FIG. 1 is an exemplary system 100 which may be used to effect the functions introduced above. The system 100 may include one or more customer terminals 110, one or more (web) site servers 120, one or more agent stations 130, one or more kiosks 140 and a multimedia call center server 150. Each of these components may communicate with one another via a network 170, such as the Internet for example. Note, however, that the agent station(s) 130 and the site server(s) 120 may be part of a semi-secure local area network (or "LAN") 174 separated from the Internet 170 by a first firewall 172. Note further that the multimedia call center server 150 may be part of a secure LAN 178 which is separated from the semi-secure LAN 174 by a second firewall 176. Each component of this exemplary system 100 is described in more detail below.

Figure 2:
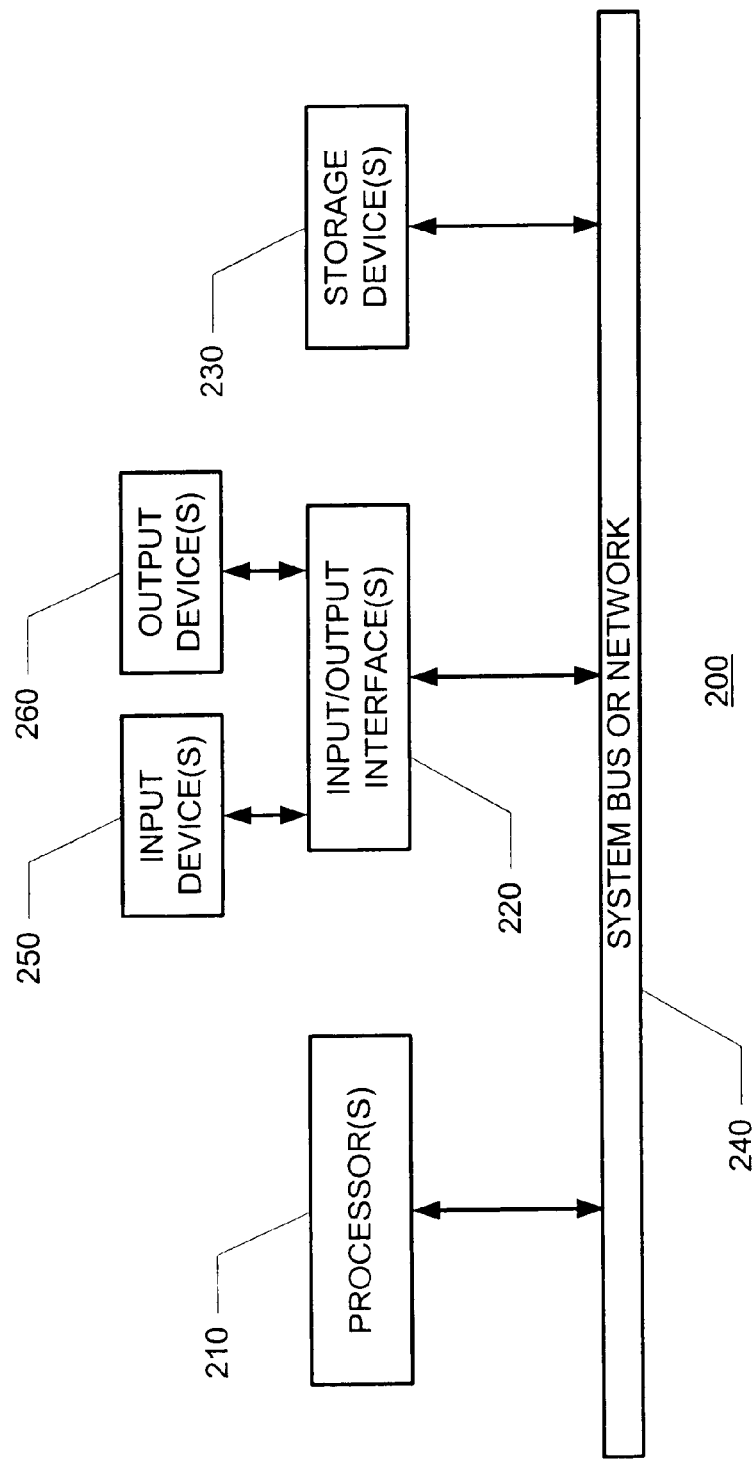
FIG. 2 is a block diagram of a device which may be used to effect various aspects of the present invention.

A customer terminal 110 may function to (i) permit users to browse Internet web (e.g., HTML) pages, (ii) render forms, (iii) accept information entered by a customer, and (iv) facilitate audio and/or video conferencing (or some other type of communications such as text messages for example). Referring to FIG. 2, these functions may be effected by a processor(s) 210, a storage device(s) 230 (such as RAM, ROM, magnetic, optical, and/or magneto-optic disks, and magnetic tape for example), input/output interfaces 220, an input device(s) 250 (such as a keyboard, a keypad, a pointing device, a microphone, and/or a video camera for example), an output device(s) 260 (such as a monitor and/or a speaker(s) for example), and a system bus or network 240. The processor(s) 210, input/output interface(s) 220, and storage device(s) 230 may communicate with one another via the system bus or network 240. Thus, for example, the functions which may be performed by the customer terminal may be effected by a personal computer.

A site server 120 may function to (i) serve requested web pages or other content such as video streams for example, (ii) maintain a history log of, and/or information entered during, a transaction (referred to simply as "transaction information"), and determine when a particular event occurs which may be used as a trigger to invoke an audio and/or video conference (or some other type of communications, such as text messages for example) between a customer at a customer terminal 110 and a live agent at an agent terminal 130. These functions, which may be performed by the site server 120, may be effected by the devices discussed above with reference to FIG. 2. By separating the multimedia site server(s) 120 from the multimedia call center 150, the multimedia call center 150 is isolated from "casual" traffic and is placed on the more secure LAN 178. More specifically, the H.323 compliant audio/video conferencing software introduced below may use dynamic port allocation for the video and audio channels. Many corporations are reluctant to open their networks to this kind of dynamic port allocation and to heavy video traffic. By using the two firewalls 172/176, the secure LAN 178 is kept free from video traffic originating from the multimedia site server 120. Video traffic is permitted on the semi-secure LAN 174.

An agent station 130 may function to (i) support an audio and/or video conference, (ii) support the communications of other types of information (e.g., text messages), (iii) browse web pages, (iv) share applications with another terminal (such as a customer terminal 110 or a kiosk 140 for example), (v) interpret transaction information, and (vi) access and update customer information. These functions, which may be performed by the agent station 130, may be effected by the devices discussed above with reference to FIG. 2.

A kiosk 140 may perform functions similar to those performed by a customer terminal 110. In addition, the kiosk may provide printing, scanning, check printing, card reading, signature capturing, and touch screen interfacing functions. Although the system 100 may include one or more kiosks 140, it does not need to have any kiosks 140 and may function more to serve customers at customer terminals 110.

A multimedia call center server 150 may include an operation and administration system 152, a multimedia session manager 158, a web-request processor 159 and storage devices 154, 156. The operation and administration system 152 may function to (i) monitor the system, (ii) check the status of any entity of the system, (iii) add or change agents, kiosks and services, (iv) generate reports of agents, system usage, etc., and (v) distribute system files to various terminals. The multimedia session manager 158 may function to (i) distribute requests for agents (also referred to simply as "calls"), (ii) set up conferences, (iii) manage communications channels, (iv) download and upload files, (v) manage skill groups and private user groups, (vi) log in and update kiosks or other system terminals, (vii) control the login of agents, (viii) distribute calls to skill groups and agents, (ix) create private user groups (or "PUGs"), and (x) create call usage records. The multimedia session manager 158 may include a call management process 162 for setting up, modifying, and/or terminating calls between an agent at an agent station 130 and a customer at a customer terminal 110 or kiosk 140. The call management process 162 may access and update memory tables 154 in a shared storage device. The multimedia session manager may also include a data support services process 166 which may access and update database files 156, which may include customer information for example, in a database. The web request processor 159 may be used to facilitate the establishment of an audio and/or video conference (or some other type of communications, such as text messages for example) over the network 170. Each of the components of the multimedia call center core system 150 may be hardware, processor(s), storage devices, hardware and/or software interfaces, and/or software programs. For example, the components 152, 158, 159 of the multimedia call center server 150 may be designed for Sun Sparc-based server class machines running the Solaris 7.0 or higher operating system from Sun Microsystems, Inc. of Mountainview, Calif. These components are designed to be installed on one (1) to three (3) machines, for example, based on the expected load and performance considerations.

§4.2.1.1 Customer Terminal Processed and Architecture

Recall that a customer terminal 110 may function to (i) permit users to browse Internet web (e.g., HTML) pages, (ii) render forms, (iii) accept information entered by a customer, and (iv) facilitate audio and/or video conferencing (or some other type of communications such as text messages for example). Recall further that these functions may be effected by the system 200, such as a personal computer for example, illustrated in FIG. 2. More specifically, the functions of permitting users to browse Internet web pages, rendering forms, and accepting information entered by a customer may be effected by browser software (such as Explorer from Microsoft Corporation or Navigator for example), an input/output interface device (such as a modem or a network interface card and router for example) a pointer device (such as a mouse for example), and a display. The function of facilitating some form of conferencing may be effected by conferencing software (such as NetMeeting from Microsoft Corporation for example), an input device (such as a video camera, a microphone, a tablet, a pointer and/or a keyboard for example), an output device (such as a display and/or a speaker(s) for example), and an input/output interface device (such as a modem or a network interface card and a router for example).

FIG. 4 illustrates the arrangement of FIGS. 4A and 4B which are referred to, collectively, as FIG. 4. FIG. 4 is a flow diagram of an exemplary method 110' which may be used to effect processes of the customer terminal 110. Please note that in the flow diagram of FIG. 4, as well as the other flow diagrams described, the steps do not need to be performed in the sequence shown unless the results of a particular step are needed before another step is performed. At decision branch point 410, it is determined whether or not a synchronized web browsing command is received. For example, an agent at an agent station 130 may control a synchronized web browsing session rendered at a customer terminal 110, via the web site server 120 for example. If it is determined that a synchronized web browsing command is received, a page (or other content or program) from the server with the uniform resource locator (or "URL") associated with the command is requested as shown in step 415. The method then continues at decision branch point 420. Returning to decision branch point 410, if it is determined that a synchronized web browsing command is not received, the method continues directly to decision branch point 420.

At decision branch point 420, it is determined whether or not a customer requested a resource (e.g., by activating a hypertext link or typing in a URL for example). If so, the resource is requested from the server with the URL associated with the request as shown in step 425. The method then continues at decision branch point 430. Returning to decision branch point 420, if it is determined that a customer did not request a resource, the method continues directly to decision branch point 430.

At decision branch point 430, it is determined whether or not content (such as content requested by the customer or via a synchronized web browsing command for example) has been received. If so, the content is rendered as shown in step 435 and the method continues at decision branch point 440. Returning to decision branch point 430, if it is determined that content is not received, the method continues directly to decision branch point 440.

At decision branch point 440, it is determined whether or not a message regarding a queued call request is received. For example, if the customer is to have a call or conference with a live agent, that customer may receive status messages about when they will be provided with a live agent. These status messages are particularly advantageous if the customer affirmatively or explicitly requests a live agent. If so, as shown in step 445, the message is rendered and the method continues at decision branch point 450. Returning to decision branch point 440, if it is determined that a message regarding a queued call request is not received, the method continues directly to decision branch point 450.

At decision branch point 450, it is determined whether or not a trigger event for invoking the establishment of a call with a live agent has occurred. The trigger event may be, for example, the customer requesting a live agent (e.g., by activating a button, typing or speaking a command, etc.), or the customer taking some other action (e.g., adding an item to a "shopping cart", adding items having a total purchase price of more than a predetermined threshold to a "shopping cart", removing an item from a "shopping cart", dwelling at a certain page for a predetermined length of time, viewing certain content or a certain sequence of content, filling out a form, issuing a particular request or command, etc.). If so, the web request processor 159 is notified, and the method 110' continues at decision branch point 460 (via Node A 458). Returning to decision branch point 450, if it is determined that a trigger event for invoking the establishment of a call with a live agent has not occurred, then the method 110' continues directly to decision branch point 460 (via node A 458).

At decision branch point 460, it is determined whether a call has already been requested and a status period has expired. If so, as shown in step 462, the method 110' may request the status of the call from the web request processor 159 (and a status period timer is reset) and the method 110' continues to decision branch point 464. Otherwise, if it is determined that a call has not already been requested or a status period has not expired, the method 110' continues directly to decision branch point 464.

At decision branch point 464, it is determined whether a call has already been requested and then a cancel call has been subsequently requested. If so, the method 110' requests that the web request processor 159 cancel the call as shown in step 466, and the method 110' continues to decision branch point 470. Otherwise, the method 110' continues directly to the decision branch point 470.

At decision branch point 470, it is determined whether or not a "page load" has been received from the web request processor 159 (in response to a trigger event as discussed above with reference to steps 450 and 455). If so, the browser opens a new window as shown in step 471. Most customers will have audio/video conferencing software, such as NetMeeting from Microsoft Corporation of Redmond, Wash. for example, residing on their terminal. If however, the needed software is not available, the user may be prompted to download the software and then continue their browsing session later, or the user may be prompted to place a telephone call to a live agent as shown in steps 472 and 474, before the method 110' is left via RETURN node 495. If, on the other hand, the needed software is available, it is loaded as shown in steps 472 and 473 and the method 110' may submit a request to the web request processor 159 to establish a call as shown in step 475. In this letter case, the method 110' then continues to decision branch point 480.

At decision branch point 480, it is determined whether or not the user has submitted a completed (or at least partially completed) form. If so, the submitted form is forwarded to the URL associated with the form as shown in step 485. The method 110' the continues at decision branch point 490. Returning to decision branch point 480, if it is determined that a form has not been submitted, the method 110' continues directly to decision branch point 490.

At decision branch point 490, it is determined whether or not the web browsing method has received a close command. If so, the method 110' is left via RETURN node 495. Otherwise, steps 410-490 of the method 110' are repeated.

Having described an exemplary customer terminal 110, an exemplary web site server 120 is now described in §4.2.1.2 below.

§4.2.1.2 Web site Server Processes and Architecture

Recall that a site server 120 may function to (i) serve requested web pages or other content such as video streams for example, (ii) maintain a history log of, and/or information entered during, a transaction (referred to simply as "transaction information"), and determine when a particular event occurs which may be used as a trigger to invoke an audio and/or video conference (or some other type of communications, such as text messages for example) between a customer at a customer terminal 110 and a live agent at an agent terminal 130. Recall further that these may be effected by the devices discussed above with reference to FIG. 2.

FIG. 5 is a flow diagram of an exemplary method 122'/124'/126' which may be used to effect the web site server processes 122/124/126. Please note that in the flow diagram of FIG. 5, as well as the other flow diagrams described, the steps do not need to be performed in the sequence shown unless the results of a step are needed before another step is performed. At decision branch point 510, it is determined whether or not a request for content is received. If so, the requested content is forwarded to the requester as shown in step 512 and a transaction history for that requester is updated as shown in step 514.

One or more of the pages provided by the site server 120 to the customer terminal may include an application program interface (or "API") for invoking the establishment of a call to a live agent. Using the API, web pages call embedded "talk to agent" buttons or active links. The API may be a URL with active parameters. The method then continues at decision branch point 520. Referring back to decision branch point 510, if a request for content is not received, the method continues directly to decision branch point 520.

At decision branch point 520, it is determined if customer information is received, such as via a completed (or partially completed) and submitted form for example. If so, transaction information is updated as shown in step 525. The method then continues at decision branch point 530. Referring back to decision branch point 520, if customer information is not received, the method continues directly to decision branch point 530.

At decision branch point 530, it is determined whether a trigger event (for invoking the establishment of a conference or call with a live agent) has occurred. The trigger event may be, for example, the customer requesting a live agent (e.g., by activating a button, typing or speaking a command, etc.), or the customer taking some other action (e.g., adding an item to a "shopping cart", adding items having a total purchase price of more than a predetermined threshold to a "shopping cart", removing an item from a "shopping cart", dwelling at a certain page for a predetermined length of time, viewing certain content or a certain sequence of content, filling out a form, issuing a particular request or command, etc.). In any event, if a trigger event occurred, the method 122'/124'/126' provides a web page with the "invoke call" API introduced above as shown in step 532. Further, an optional step of forwarding transaction information (e.g., to the multimedia session manager 158) may be performed at this time as shown in step 534. In this way, when a live agent becomes available, they will have access to information already known about the customer. The method then branches back to decision branch point 510. Referring back to decision branch point 530, if a trigger event has not occurred, the method continues directly to decision branch point 510.

Having described an exemplary web site server 120, an exemplary multimedia call center server is now described in §4.2.1.3 below.

§4.2.1.3 Multimedia Call Center Server

The multimedia call center server 150 is largely responsible for managing the system 100. It may function to control the distribution of calls, perform user validation, manage network resources, monitor station clients, and store and/or create call usage records.

When a station (e.g. agent station 130 or a kiosk 140 (and optionally, a customer terminal 110) logs on, it must first register with the multimedia call center server 150. The multimedia call center server 150 accepts TCP/IP based socket connections from both such stations. (See, e.g., FIG. 3.) The station can then register (or login) with the multimedia call center server 150. The multimedia call center server 150 may then create a memory table entry 154 for that station. When that socket connection dies, or is terminated, all table entries 154 associated with it terminate. Upon login, the multimedia call center server 150 may verify that all remote software components are valid. If any of the stations do not have valid software, the multimedia call center server 150 may send the appropriate software files to that station.

When a customer wants to reach an agent, the customer negotiates first with the multimedia session manager 158. The multimedia session manager 158 may attempt to assign a call request to a next available agent. As soon as, a qualified agent becomes available, that agent may be given a call back number (or IP Address) at which the customer can be reached. The multimedia call center server 150 is not necessarily actually involved in establishing the call. Conferencing support processes, such as NetMeeting from Microsoft Corporation for example, in the agent and customer stations may perform this task over the network 170, such as a TCP/IP network. The multimedia call center server 150 may then record information about the nature of the call and may then proceed to monitor network/station status.

When the call with the customer is completed, the multimedia call center server 150 is notified and the agent drops the call. This agent then becomes available to serve another call waiting in a queue.

The multimedia call center server may also facilitate call transfers and multiparty calls.

§4.2.1.3.1 Multimedia Call Center Server Architecture

The multimedia call center server 150 may be designed for use on a UNIX platform. The modules 152, 158 and 159 may use shared memory and semaphores as supported by the operating system. The use of shared memory ensures data stability and ease of recovery. It also allows for data sharing between processes.

Figure 3:
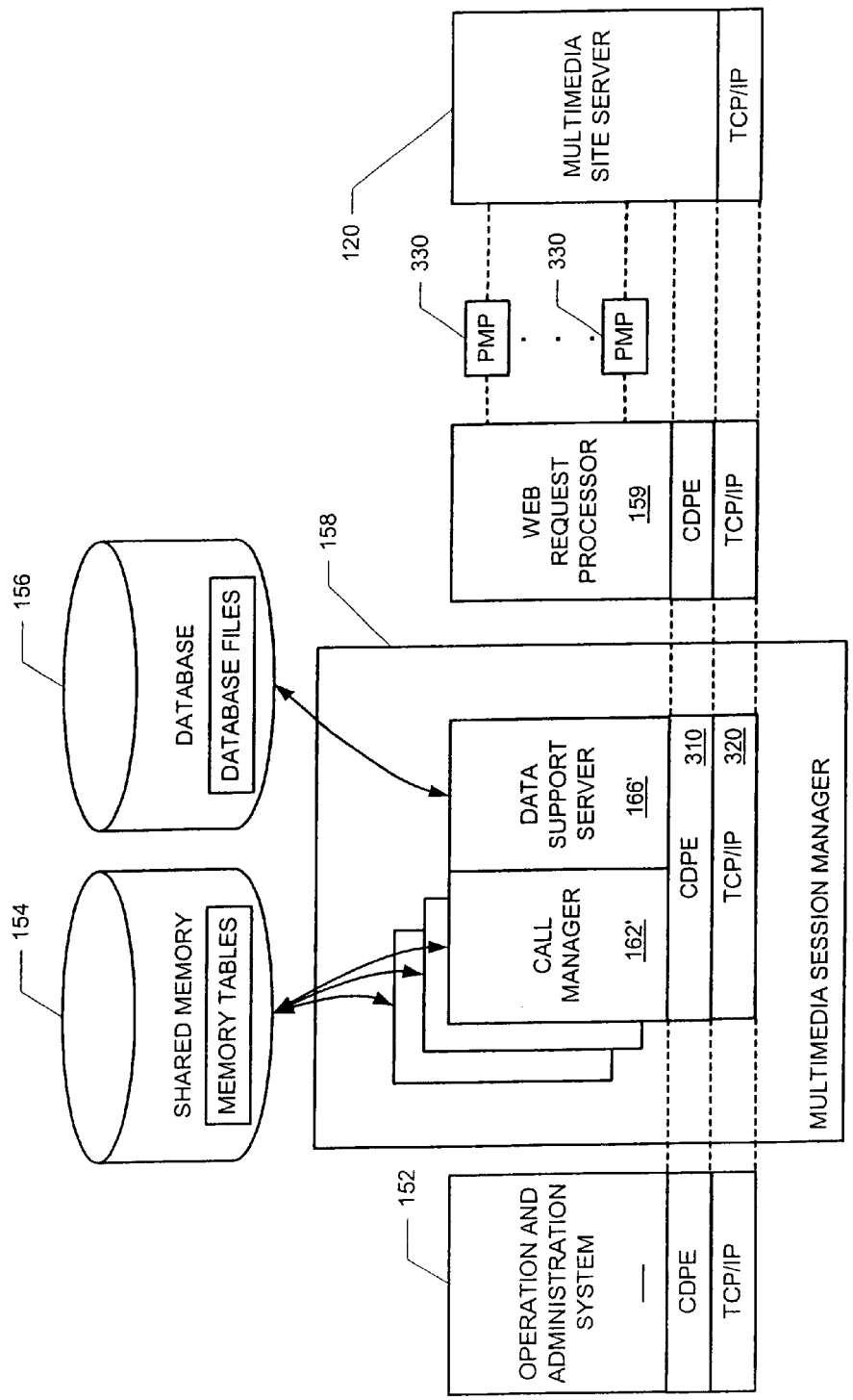
FIG. 3 illustrates components of an exemplary multimedia call center server.

The multimedia call center server 150 may include three (3) main components—a session manager 158, an operation and administration system 152 and a web-request processor 159. The session manager is described in more detail in §4.2.1.3.5 below. The operation and administration system 152 is described in more detail in §4.2.1.3.4 below. Finally, the web request processor 159 is described in more detail in §4.2.1.3.6 below. As shown in FIG. 3, the session manager 158, the operation and administration system 152 and the web request processor 159 may communicate with one another via a CDPE (Concurrent Distributed Processing Environment) layer 310. The entire system may sit atop a TCP/IP stack 320.

§4.2.1.3.2 Database Files

Recall that user information may be stored, updated, and accessed by the operation and administration system 152. FIGS. 7 through 10 are exemplary data structures of files in the user information database 156. FIG. 7 illustrates a directory database which contains a list of all stations known to the session manager 158. The directory database is described in §4.2.1.3.2.1 below. FIG. 8 illustrates a skill database which contains a list of all skills of agents known to the session manager 158. The skill database is described in §4.2.1.3.2.2 below. FIG. 9 illustrates a category database which contains a list of all category names known to the session manager 158. Since the details of the category database are not needed to appreciate the present invention they are not described here. Finally, FIG. 10 illustrates a private user group database which contains a list of all private user group names known to the session manager 158.

Since the details of private user group database are not needed to appreciate the present invention, they are not described here.

§4.2.1.3.2.1 Directory Database

The field names 710 of the directory database, as well as their size 720 and description 730, are set forth in FIG. 7. Note that each kiosk 140 or agent station 130 has a unique login name 740, an associated password 750, a (via the web request processor 159) unique port identifier 760, and a user name directory listing 770. Also note that the port identification 760 may also be referred to as the "address" of the station. Since the "addresses" of all potential customer terminals 110 cannot be determined ahead of time, they are gathered by the multimedia call center server 150 (via the web request processor 159) at the time a customer desires to access a live agent.

§4.2.1.3.2.2 Skill Database

The field names 810 of the skill database, as well as their size 820 and description 830, are set forth in FIG. 8. The skill database stores primary video conferencing protocols 840 and addresses 845, secondary video conferencing protocols 850 and addresses 855, and default video conferencing protocols 860 and addresses 865. Since the video conferencing protocols and addresses of all potential customer terminals 110 cannot be determined ahead of time, they are gathered by the multimedia session manager 150 (via the web request processor 159) at the time a customer desires to access a live agent.

§4.2.1.3.3 Shared Memory Tables

Memory tables are data structures that reside in shared memory 154. They are initialized upon startup of the call management process 162 and are accessible by the call management process 162. Having multiple instances of the call management process 162 permits data sharing. FIG. 11 is a station table 1100, FIG. 12 is an active call table 1200, and FIG. 13 is a skill table 1300. Each is described in more detail below.

A station table 1100 contains information related to a station, such as a kiosk 140 or a agent station 130 for example. The station table 1100 illustrates field names 1110, and their type 1120, size 1130, and description 1140. As shown in FIG. 11, the station table 1100 may include a login name 1152 for the station, an associated password 1154, a unique stations port identifier 1156, a video conferencing protocol type identifier 1162, a video conferencing address 1164, an alternative video conferencing protocol type identifier 1166, an alternative video conferencing address 1168, an internet protocol (or "IP") address 1170 of the station, an encryption type 1182 employed by the station, and an (public) encryption key 1184 disseminated by the station.

The active call table 1200 contains information related to an established call. Since the active call table 1200 is not particularly relevant to the understanding of the invention, it is not described in further detail. The skill table 1300 contains information related to the known skills. Since the skill table 1300 is not particularly relevant to the understanding of the invention, it is not described in further detail.

§4.2.1.3.4 Operation and Administration System Processes and Architecture

The operation and administration system 152 may facilitate all administration-related tasks. These tasks may include generating reports, setting up resources, and managing the database 156. The operation and administration system 152 may communicate with other components of the multimedia call center 150 via the CDPE layer 310.

§4.2.1.3.5 Multimedia Session Manager Processes and Architecture

The multimedia session manager 158 may function to facilitate all session related tasks, namely routing calls, managing resources (e.g., stations) and distributing files. The session manager 158 may communicate with other components via the CDPE layer 310. Having introduced the session manager 158, components which may be included in the session manager are introduced in §§4.2.1.3.5.1 and 4.2.1.3.5.2 below.

§4.2.1.3.5.1 Call Management Processes

The call management process 162 may be used for call setup, call modification (e.g., adding parties, transfers, etc.) and call termination. The call management process 162 does not actually place or route a call—rather, it notifies the relevant parties to place a call or to receive a call. The actual call is independent of the multimedia call center server 150. Call setup is initiated by the customer terminal 110 (or at the kiosk 140) and the call is placed from the agent station 130 to the customer terminal 110.

Stations, such as agent stations 130 and kiosks 140 login with the call management process 162 upon startup. More specifically, the station may identify itself and it capabilities using a unique identifier and can send a login name. If the call management process 162 determines that the software residing on a station is out of date, it will notify the data support server process 166 to transfer all necessary files. Station login is described in U.S. patent application Ser. No. 09/487,049, by M. Reza Shafiee and Sankar Subramanian, filed on Jan. 19, 2000 and entitled "METHODS AND APPARATUS FOR PROVIDING AGENT CONTROLLED SYNCHRONIZED BROWSING AT A TERMINAL" (which is incorporated herein by reference). However, unlike a kiosk 140, a customer's home-based terminal (such as a personal computer for example) will obviously not perform the same login steps. Rather, the web call management process 184, described in §4.2.1.3.6 below, facilitates the establishment of a call between a customer terminal 110 and an agent 130.

The call management process 162 may be an event driven process. A particular message received by a station may cause a sequence of counter events to occur. In addition, an internal time process may run to facilitate the triggering of system events.

FIG. 6 is a high level flow diagram of a portion of an exemplary method 162' for effecting the multimedia session manager 158. At decision branch point 610, it is determined whether or not an agent has been requested (e.g., whether or not a not yet queued request for an agent has been received). If, not, the method 162' branches to decision branch point 660,' (discussed below). If, on the other hand, an agent has been requested, the request is queued as shown in step 620 and acknowledge may be submitted to the requester (e.g., the web request processor 159) as shown in step 625. The method 162' then continues to decision branch point 630.

At decision branch point 630, it is determined whether or not there is an agent (e.g., an agent in an appropriate skill group) available to take the request. If not, the method 162' branches to decision branch point 660, (described below). Otherwise, if an agent is available to take the request, the call request (e.g., along with transaction history information) is forwarded to the available agent as shown in step 645. Further, an updated status is sent (e.g., to the web request processor 159 (which submitted the request)) as shown in step 645. The method then continues to decision branch point 650. At decision branch point 650, it is determined whether or not an acknowledge message has been received from the agent. If not, the method may branch to decision branch point 665. At decision branch point 655, if a time out period has not expired, the method 152' branches back to decision branch point 650. Otherwise, if the time out period has expired, the method 162' is left via RETURN node 690. Referring back to decision branch point 650, if an acknowledge is received from the agent, tables (for the agent and, if appropriate, the customer) are updated as shown in step 680 and the method 162' continues to decision branch point 660.

At decision branch point 660, it is determined whether or not a "wrap-up" status message has been received (e.g., from the agent). If so, the table (e.g., associated with the agent) is updated as shown in step 665 and the method 162' continues to decision branch point 670. Otherwise, the method 162' continues directly to decision branch point 670.

At decision branch point 670, it is determined whether or not a transfer request has been received (e.g., from an agent). If so, the call is queued as shown in step 675 and the method 162' is left via RETURN node 690. Otherwise, the method 162' proceeds directly to RETURN node 690.

§4.2.1.3.5.2 Data Support Service Process

The data support services process 166 may be used to record all session data. It may receive a copy of all messages to and from the call management process 162. The data support services process 166 may record such messages into a circular log file. This log file may be subject to post processing for creating data reports.

§4.2.1.3.6 Web Request Processor

FIG. 14 is a block diagram which illustrates an exemplary architecture of a web request processor 159. As discussed above with reference to FIG. 1, the exemplary web request processor 159' may include a brownie manager 182' (for effecting a brownie management process 182), a web call manager 184' (for effecting a web call management process 184) and a script manager 186' (for effecting a script management process 186). An instance 1402 of each of these processes may be provided for each call (e.g., a per-message process). Each instance 1402 may have one or more common graphical interface (or "CGI") bins 1404 per message. Basically, CGI bins 1404 facilitate the generation of dynamic web pages. More specifically, with normal hyper text mark-up language (or "HTML"), each hypertext link has an associated uniform resource locator (or "URL") which corresponds to a file location. These URLs are pre-existing and static. CGI bins 1404 basically call an executable process, the output of which may be an HTML file (i.e., a dynamic page). For example, and as will be described in more detail below, a "call button" may be used to dynamically create a call request, the call request having a browser type, an IP address, and a video capability. Finally, the exemplary web request processor 159' may include a web server 1412 which may communicate with the web browsing process 112 at the customer terminal 110.

The brownie management process 182 (or the brownie manager 182') is described in more detail in §4.2.1.3.6.1 below. Then, the script management process 186 (or the script manager (186') is described in more detail in §4.2.1.3.6.2 below. Finally, the web call management process 184 (or the we call manager 184') is described in more detail in §4.2.1.3.6.3 below.

§4.2.1.3.6.1 Brownie Management Process

The brownie management process 182 may be used to assign a unique identifier (also referred to as a "brownie") to each call request. This brownie is then referenced in all the subsequent transactions and pages to identify the call. A brownie is not to be confused with cookies which are set on client browsers. A brownie is not stored on the client browser. Rather, each page sent out by the web request processor 159 has the brownie.

§4.2.1.3.6.2 Script Management Process

The script management process 186 may be used to customize a collection of Javascript-based Web pages that are downloaded to the browsing process 112 at the customer terminal 110 as needed.

§4.2.1.3.6.3 Web Call Management Process

The web call management process 184 may be used to place requests in the CDPE queues. It can also be used to provide status updates to the browsing process 112 at the customer terminal 110 periodically, or in response to an event or a request. The web call management process 184 may also be used to coordinate call transfers and disconnects.

§4.2.1.4 Agent Station Processes and Architecture

Recall from §4.2.1 above that the agent stations 130 may function to permit a live agent to assist a customer at a kiosk 140 or at a terminal 110. Recall further that such assistance may take the form of audio, video, and/or data (e.g., text message) communications (as well as synchronized (web) browsing in which the agent station 130 acts as a guide terminal and the kiosk 110 or customer terminal 110 acts as a follower terminal which is disclosed in U.S. patent application Ser. No. 09/487,049.) The agent station 130 may also function to invoke the establishment of a connection between it and another terminal, such as a kiosk 140 or another agent station 130. Further, the agent station 130 may function to encrypt (using a public key for example) communications sent from it. Furthermore, the agent station 130 may function to control access to content, such as web pages for example. An agent station 130 may further function to permit a live agent to control kiosk peripherals, access customer information from a database 156, update customer information, send and receive messages to and from other live agents, transfer customers to another live agent, and access call information. These functions, which may be performed by the agent station 130, may be effected by the devices discussed above with reference to FIG. 2. In an exemplary embodiment, agent stations 130 may include a (web) (e.g., HTML) browser process 134 which is similar to the (web) browser process 112 included in the customer terminals 110, an applications sharing process 136 (e.g., a synchronized (web) browsing process) a transaction history tracking process 138, an audio/video conferencing process 132 and other (e.g., text messages) communications process 133.

In view of the foregoing, a live agent can view scanned identification documents, interpret them, and manually enter name, address and other information obtained from the identification documents into one or more forms, e.g., credit applications, purchase forms, etc. Since communication between the kiosk 110 and the agent stations 130 may be provided over a secure, e.g., encrypted data channel, confidential information may be exchanged without fear of unauthorized interception. Thus, for example, completed application or purchase forms can be transmitted to a kiosk 140, a signature on the form captured, and payment received without security concerns. In addition, a live agent can control the printing of checks, money orders, etc. at the kiosk 140. Thus, for example, if a loan application is approved, the customer can be provided the money in the form of a check issued directly from the kiosk 140. Furthermore, a live agent can fill out service and/or purchase forms based on, e.g., customer information obtained via scanned identification documents, and control the kiosk 140 to print the completed form. A customer's signature on a completed form can be captured using the kiosk's signature capture device and the completed form with signature can be printed at the kiosk 140 as well as the agent station 130. The flat bed scanner can be used to acquire images of driver's licenses, credit cards and other forms of identification.

FIG. 15 is a flow diagram of an exemplary method 132' which may be used to effect the audio/video conferencing process 132 (and, optionally, the transaction history tracking process 138). At decision branch point 1505, it is determined whether or not a call request has been received, from the multimedia session manager 158 for example. The call request may include information for establishing a call, such as the customer terminal's browser type, IP address, video capabilities, and name. If a call request has not been received, the method 132' continues to decision branch point 1520 (discussed later). If, on the other hand, a call request has been received, then the agent station 130 establishes a call with the customer terminal associated with the request as shown in step 1510. An audio/video call may be established using means complaint with the H.323 standard, for example, via NetMeeting from Microsoft Corporation. Although not shown in FIG. 15, if the customer terminal 110 has less capabilities, then the other (e.g., text messaging) communications process 133 can be invoked to establish a different type of "call" between the agent station 130 and the customer terminal 110. Next, the method 132' may send a connect response message to the multimedia session manager 158, as shown in step 1515. The method 132' then continues to decision branch point 1520.

At decision branch point 1520, it is determined whether or not a call is in progress and a call disconnect is commanded (e.g., by the agent at the agent station 130). If so, the call with the requesting customer terminal is terminated as shown in step 1525. This call termination may be done in accordance with H.323 standards, such as via NetMeeting of Microsoft Corporation for example. Then the method 132' may send a "wrap up" state indication to the multimedia session manager 158 as shown in step 1530 before the method 132' continues to decision branch point 1535. Referring back to decision branch point 1520, if a call is not in progress or if a call disconnect is not commanded, then the method 132' continues directly to decision branch point 1535.

At decision branch point 1535, it is determined whether or not a call is in progress and a call transfer has been commanded (e.g., by an agent at the agent station 130). If not, the method 132' continues back to decision branch point 1505. If, on the other hand, a call is in progress and a call transfer has been commanded, then the method 132' submits a transfer request to the multimedia session manager as shown in step 1540. As shown in decision branch point 1545, the method 132' awaits a transfer response from the multimedia session manager 158. Assuming that a positive response is received (which indicates that the multimedia session manager 158 has gotten another agent to take the call), the method 132' continues to step 1525, which was already discussed above. Although not shown here, if a time out period expires, or if the multimedia session manager 158 informs the method 132' that no other agent is available to take the call, the method 132' may continue back to decision branch point 1505.

Having described exemplary processes, methods, apparatus and data structures for effecting various aspects of the present inventions, examples which illustrate operations of such exemplary embodiments are now presented in §4.3 below.

§4.3 Example of Operation

Having described the system and its components, an example which illustrates how a audio and/or video conference (or some other type of communication such as text messages) between a customer at a customer terminal and a live agent at an agent station may be invoked, set up, and carried out is provided in §4.3.1 below with reference to FIG. 16. Then, an example which illustrates how a "call" is disconnected is provided in §4.3.2 with reference to FIG. 17. Finally, an example which illustrates how a "call" is transferred from one agent to another is provided in §4.3.3 with reference to FIG. 18.

§4.3.1 Example of Invoking and Establishing a Call Between a Customer Terminal and an Agent FIG. 16 is a messaging diagram which illustrates how a conference (or call) can be established between a customer at a terminal 110 and a live agent at a station 130. As shown in FIG. 16, a customer may request, via terminal 110, content (e.g., web pages, HTML text, pictures, audio and/or video streams, etc.) and provide information (e.g., via forms) to a web site server 120. This is depicted by communication 1605. (Recall steps 420 and 425 of FIG. 4.) In response to such requests, the web site server 120 can provide content and forms to the customer's terminal 110. This is depicted by communication 1610. (Recall steps 510 and 512 of FIG. 5) At some point, the web site server 120 may recognize an event which is used as a trigger to establish (or invoke) a conference (or call). The trigger event may be, for example, the customer requesting a particular web page (or pages), or the customer taking some other action (e.g., adding an item to a "shopping cart", adding items having a total purchase price of more than a predetermined threshold to a "shopping cart", removing an item from a "shopping cart", dwelling at a certain page for a predetermined length of time, viewing certain content or a certain sequence of content, filling out a form, issuing a particular request or command, etc.). Such an event is depicted by note 1615. In response to the event, the web site server 120 may provide a page with a "call agent" application program interface (or "API") to the customer terminal 110, as shown by communication 1620. This API will allow the customer to issue a request for a live agent. For example, the API may include a "call agent" button which may be activated by the user, or may monitor the customer terminal 110 for some other event for invoking the establishment of a call to an agent.

Assuming that an agent call is requested, by means of the API, by the customer terminal 110, such a request is provided to the web request processor 159 as depicted by communication 1625. (Recall steps 450 and 455 of FIG. 4.) The request 1625 may include information regarding the browser being used at the customer terminal 110, the internet protocol (or "IP") address of the customer terminal 110, a name or identifier associated with the customer terminal 110, and a video capability of (e.g., video protocols supported by) the customer terminal 110. The request 1625 may also include transaction information which may be used by a live agent as will be described below.

In response, the web request processor 159 may forward a page load to the customer's web browser as shown in communication 1630. The page load communication 1630 may include a command to open a new browser window, as well as a command to load conferencing software and video streaming software (such as NetMeeting from Microsoft Corporation of Redmond, Wash. and RealVideo). It is presumed that this software resides on the customer terminal 110. If not, the customer terminal may render a message prompting the user to load the needed software or to make an ordinary telephone call to an agent. Alternatively, assuming that the conferencing software can be loaded in a reasonable amount of time from a remote source, it may be loaded and started from such a remote source. In response to the page load communication 1630, the customer terminal 110 may forward a web call request to the web request processor 159 as shown in communication 1635. This communication 1635 may be automatically generated by the page load 1630, using JAVA script for example. (Recall steps 470, 471, 472, 473 and 475 of FIG. 4.) The web call response communication 1650 from the web request processor 159 to the customer terminal 110 may include an indication that the agent call request has been queued. The customer terminal 110 may render a video stream, for example, download by the site server 120, while it waits for an agent to take its "call". (See note 1652.) At about the same time, the web request processor 159 may request an agent (agents may be grouped based on their skills) from the multimedia session manager 158 as shown by communication 1640. (Recall step 610 of FIG. 6.) The multimedia session manager 158 may acknowledge this request as shown by communication 1645. Thus, as shown by note 1660, the request is queued until an agent becomes available.

Referring to communications 1672 and 1674, periodically, or in response to a customer request or other event, the customer terminal 110 may request the status of a call request and the web request processor 159 may provide a status reply. The status reply may include one or more messages (e.g., "please wait for next available agent", "estimated time for next agent to become available is__", "there are__customers in front of you", etc.) related to the status of the customer's wait for a live agent. (Recall steps 440 and 445 of FIG. 4.)

Referring to communications 1684, 1686 and 1688, at any time before an agent indicates that it is available to take the call, the customer may, via the customer terminal, request to cancel the call. If they do so, as indicated by note 1682, a cancel call request communication 1684 may be provided from the customer terminal 110 to the web request processor 159. In response, the web request processor 159 may submit a request to de-queue the call to the multimedia session manager 158 as shown in communication 1686 and may provide a cancel call reply communication 1688 to the customer terminal 110. (Recall step 464 of FIG. 4.)

Once an agent becomes available to take a queued call as shown in note 1660, the multimedia session manager 158 may update the status of the call and communicate this new status to the web request processor 159, as shown in communication 1662. In addition, the multimedia session manager 158 may submit the call request to the available agent 130 as shown by communication 1664. (Recall step 640 of FIG. 6.) The communication 1664 may include customer information such as their browser type, their IP address, their name and their video capabilities. Recall that the customer provided the web request processor 159 with this information in the call request communication 1625, and the web request processor 159 may have provided the multimedia session manager 158 with this information in request agent communication 1640.

In response to the call request communication 1664, the available agent station 130 may establish an audio, video, and/or other data (e.g., text message) call with the customer terminal 110. (Recall step 1510 of FIG. 15.) At about this time, the agent station 130 may also provide a call connect response communication 1668 to the multimedia session manager 158. (Recall step 1515 of FIG. 15.) In response, the multimedia session manager 158 may update the tables for both the agent 130 and the customer terminal 110 as indicated by note 1690. (Recall step 680 of FIG. 6.) Also, after the audio, video, and/or data call is established between the agent 130 and the customer terminal 110, the streams of via which may have been provided from the site server 120 may be stopped as shown by note 1692. (Note that the video streams may be provided while the conferencing software is being started and/or as the call is queued while awaiting an available agent.) Further, the web request processor 159 may provide script-based web pages to the customer terminal 110 as shown by communication 1694.

Although not shown in. FIG. 16, information regarding the customer or the history of the customer's transaction(s) with the web site server 120 may also be communicated to the agent station 130 so that the agent does not need to request information from the customer that the customer has already provided (e.g., via forms).

In view of the foregoing, web designers can use a small and easy to use API to facilitate the establishment of a call (e.g., a video conference) with a live agent. Such a call may be invoked upon the occurrence of a trigger event.

The messaging diagram of FIG. 16 is just one example of how a call can be established between a customer and a live agent. Those skilled in the art will appreciate that there are other ways of establishing such a call and forwarding transaction information and/or other customer information to the live agent. For example, the call may be established from the customer to the available agent. (Recall that the multimedia session manager 158 has information about each of the agent stations.)

Having described an example of how a call between a customer and an agent may be established, terminating such a call is described in §4.3.2 below with reference to FIG. 17 and transferring such a call is described in §4.3.3 below with reference to FIG. 18.

§4.3.2 Example of Terminal a Call Between a Customer Terminal and an Agent

FIG. 17 is a messaging diagram which illustrates how a conference (or call) between a customer at a terminal 110 and a live agent at a station 130 can be terminated. As shown in note 1705 of FIG. 17, an agent at an agent station 130 may "hang up". In response, the call may be terminated, such as via means complaint with the H.323 standard as shown in communication 1710. (Recall steps 1570 and 1525 of FIG. 15.) The agent station 130 may also inform the multimedia session manager 158 of the fact that the call is (or is being) terminated (or "wrapped up") as indicated in communication 1715. In response, the multimedia session manager 158 may update tables for both the customer terminal 110 and the agent station 130 as shown in note 1720, and may further provide a response message to the agent station 130 as shown in communication 1725. (Recall steps 660 and 665 of FIG. 6.)

In addition, in response to the call termination 1710, the customer terminal 110 may request a status from the web request processor 159 as shown in communication 1730. In response, the web request processor 159 provides the status to the customer terminal 110 in communication 1735. In this case, the status will be that the call has been (or is being terminated). As shown in note 1740, the customer terminal 110 may then render a "thank you" page. As described in §4.3.3 below, if the agent terminated that call pursuant to a call transfer operation, the status provided in communication 1735 will indicate that the call is being transferred to another live agent. In such a case, the customer terminal 110 may be made to wait for the completion of the call transfer.

Having briefly introduced a call transfer operation, an example of the operation of a call transfer is now provided in §4.3.3. below with reference to FIG. 18.

§4.3.3 Example of Transferring a Customer call From One Agent to Another agent FIG. 18 is a messaging diagram which illustrates how a conference (or call) 1802 between a customer at a terminal 110 and a live agent at a station 130a can be transferred to another live agent at another station 130b. The live agent at the first station 130a may initiate a call transfer as indicated by note 1805. In such an event, a transfer request is submitted from the station 130a to the multimedia session manager 158 as shown by communication 1810. (Recall step 1540 of FIG. 15.) In response, the multimedia session manager 159 may update the tables as shown in note 1815 and may submit a transfer response back to the agent station 130a as shown in communication 1820. (Recall step 1545 of FIG. 15 and step 665 of FIG. 6.)

The agent station 130a may then terminate the call, such as via procedures compliant with the H.323 standard for example, as shown in communication 1825. (Recall step 1525 of FIG. 15.) The agent station 130a may also inform the multimedia session manager 158 of the fact the call is (or is being) terminated (or "wrapped up") as indicated in communication 1830. In response, the multimedia session manager 158 may update tables for both the customer terminal 110 and the agent station 130a as shown in note 1835, and may further provide a response message to the agent station 130a as shown in communication 1840. (Recall steps 660 and 665 of FIG. 6.)

In addition, in response to the call termination 1825, the customer terminal 110 may request a status from the web request processor 159 as shown in communication 1855. In response, the web request processor 159 provides the status to the customer terminal 110 in communication 1860. In this case, the status will be that the call is being transferred. As shown in note 1865, the customer terminal 110 may then wait for the call to be transferred. Further, as the customer terminal is waiting, it may render a video stream (or slide show, etc.).

As shown in note 1845, the multimedia session manager 158 may queue the call transfer. (Recall steps 670 and 675 of FIG. 6.) The multimedia session manager 158 may submit the call request to the second agent (which may be the next available agent) 130b as shown by communication 1850. The communication 1850 may include customer information such as their browser type, their IP address, their name and their video capabilities. Recall that the customer provided the web request processor 159 with this information in the call request communication 1625 of FIG. 16, and the web request processor 159 may have provided the multimedia session manager 158 with this information in request agent communication 1640 of FIG. 16.

In response to the call request communication 1850, the available agent station 130b may establish an audio, video, and/or other data (e.g., text message) call 1870 with the customer terminal 110 as shown by communication 1870. At about this time, the agent station 130 may also provide a call connect response communication 1880 to the multimedia session manager 158. In response, the multimedia session manager 158 may update the tables for both the second agent 130b and the customer terminal 110 as indicated by note 1885. Also, after the audio, video, and/or data call 1870 is established between the agent 130b and the customer terminal 110, the streams of video which may have been provided from the site server 120 may be stopped as shown by note 1875. (Note that the video streams may be provided while the call is queued while awaiting an available agent.) Further, although not shown here, the web request processor 159 may provide script-based web pages to the customer terminal 110. (Recall communication 1694 of FIG. 16.)

§4.4 Conclusions

In view of the foregoing, the present invention permits a customer at almost any terminal (having some video and/or audio conferencing capabilities) to access a live agent via a "call". The establishment of the call may be handled by means (e.g., 150) remote from a web site server 120—the web site server 120 may employ an API to invoke such means (e.g., 150). The call may be carried over a semi-secure network which is isolated from the means (e.g., 150) by a firewall 176. Basically, the API permits the means (e.g., 150) to gather information it passes onto a next available agent for establishing a "call" from the agent station 130 to the customer terminal 110 without needing any prior knowledge about the customer terminal 110.

The live agent's station 130 can access information about the customer that has already been gathered.

While the customer awaits a live agent, it can receive video streams, slide shows, etc. To entertain or inform them from the site server 120.

What is claimed is:

1. A method for establishing a conference between a customer at a customer terminal and a live agent at an agent station, the method comprising steps of:
    a) accepting a call request from the customer terminal;
    b) requesting that an available live agent take the call request;
    c) when a live agent becomes available to take the call request, passing customer information to the agent station associated with the available live agent; and
    d) establishing a conference from the agent station associated with the available live agent to the customer terminal,
    wherein the call request is generated in response to a trigger event, the trigger event selected from a group of events consisting of: adding an item to a virtual shopping cart; adding items having a total purchase prices of more than a predetermined threshold to a virtual shopping cart; and removing an item from a virtual shopping cart.

2. The method of claim 1 wherein the group further includes rendering certain content; and rendering a certain sequence of content.

3. In a system having a site server, a web call request processor and at least one live agent at at least one agent station, a method of invoking the establishment of a conference between a customer at a customer terminal and a live agent at an agent station, the method comprising steps of:
   a) accepting, from the site server, an "invoke call" application program interface;
   b) determining whether or not a "call agent" event has occurred;
   c) if it has been determined that a "call agent" event has occurred, then notifying the web request processor using the "invoke call" application program interface; and
   d) if it has been determined that a page load script has been received, then
      i) opening a new window,
      ii) determining whether or not conferencing software is available to the customer terminal, and
      iii) if it has been determined that conferencing software is available to the customer terminal, then
         A) loading the conferencing software, and
         B) submitting a conference establishment request to the web request processor.

4. The method of claim 3 wherein the invoke call application program interface is part of a web page.

5. The method of claim 3 wherein the conferencing software is compliant with the H.323 standard.

6. The method of claim 3 wherein the conference establishment request includes at least one of (a) a video capability of the customer terminal; and (b) a browser type used by the customer terminal.

7. In a system having a customer terminal and a web conference request processor for establishing a conference between a customer at the customer terminal and a live agent at an agent station, a method for controlling a site server, the method comprising steps of:
   a) if a request for content has been received from the customer terminal, forwarding the requested content to the customer terminal;
   b) if a trigger event occurs, providing an "invoke call" application program interface to the customer terminal,
   wherein the trigger event is selected from a group of events consisting of: adding an item to a virtual shopping cart; adding items having a total purchase prices of more than a predetermined threshold to a virtual shopping cart; removing an item from a virtual shopping cart; and dwelling at a certain web page for more than a predetermined length of time.

8. The method of claim 7 further comprising a step of:
   c) maintaining a transaction history log of actions taken by, and information received from, the customer terminal.

9. The method of claim 8 further comprising a step of:
   d) if a trigger event occurs, forwarding the transaction history log to the web conference request processor.

10. The method of claim 7 wherein the group further includes rendering certain content; and rendering a certain sequence of content.

* * * * *